(12) United States Patent
Cappeller et al.

(10) Patent No.: US 8,776,964 B2
(45) Date of Patent: Jul. 15, 2014

(54) GAS CYLINDER ACTUATOR WITH OVERTRAVEL SAFETY DEVICE

(75) Inventors: Augusto Cappeller, Bassano del Grappa (IT); Massimo Fiorese, Bassano del Grappa (IT); Daniel Fantinato, Bassano del Grappa (IT)

(73) Assignee: Special Springs S.r.l., Rosa' (IT)

( * ) Notice: Subject to any disclaimer, the term of this patent is extended or adjusted under 35 U.S.C. 154(b) by 50 days.

(21) Appl. No.: 13/138,486

(22) PCT Filed: Mar. 9, 2010

(86) PCT No.: PCT/EP2010/052962
§ 371 (c)(1),
(2), (4) Date: Aug. 25, 2011

(87) PCT Pub. No.: WO2010/102994
PCT Pub. Date: Sep. 16, 2010

(65) Prior Publication Data
US 2011/0303084 A1    Dec. 15, 2011

(30) Foreign Application Priority Data

Mar. 10, 2009 (IT) ............... PD2009A0043
Apr. 17, 2009 (IT) ............... PD2009A0096

(51) Int. Cl.
*F16F 9/48*    (2006.01)
(52) U.S. Cl.
USPC ..................... 188/286; 267/64.11

(58) Field of Classification Search
USPC ............... 188/284, 322.16, 322.19, 286–287; 92/163–164, 86.5, 169.1, 162 R, 85 R, 92/6 R; 91/42; 267/64.11
See application file for complete search history.

(56) References Cited

U.S. PATENT DOCUMENTS 5,680,808 A * 10/1997 Day et al. ............... 92/168
5,735,371 A *  4/1998 Jobelius et al. .......... 188/276
(Continued)

FOREIGN PATENT DOCUMENTS

DE    26 25 757 A1    12/1977
DE    201 07 426 U1    8/2001
(Continued)

OTHER PUBLICATIONS

Communication pursuant to Rule 114(2) EPC of Feb. 16, 2012 for European Patent Application No. 10708189.5.

*Primary Examiner* — Anna Momper
(74) *Attorney, Agent, or Firm* — Modiano & Associati; Albert Josif; Daniel J. O'Byrne

(57) ABSTRACT

A gas cylinder actuator with overtravel safety device, comprising a tubular jacket which is closed by a bottom provided with a gas filling valve and at the opposite end by a head portion, which is provided with a hole for the passage of a stem with a piston; the gas cylinder actuator has, on the inner face of the jacket, in the compression chamber, a region in low relief designed to interrupt the seal provided by a gasket of the piston or the head portion, which act against the inner face.

3 Claims, 5 Drawing Sheets

(56) References Cited

U.S. PATENT DOCUMENTS

| | | |
|---|---|---|
| 5,884,734 A | 3/1999 | Hiramoto et al. |
| 5,971,117 A | 10/1999 | Grundei et al. |
| 6,213,261 B1 * | 4/2001 | Kunkel .................. 188/314 |
| 6,431,332 B1 | 8/2002 | Phelizot |
| 7,004,292 B2 * | 2/2006 | Schilz .................. 188/276 |
| 2002/0088677 A1 | 7/2002 | Fitz et al. |
| 2005/0016803 A1 | 1/2005 | Brummitt |
| 2005/0274583 A1 | 12/2005 | Hewel |
| 2012/0136537 A1 * | 5/2012 | Galasso et al. .................. 701/37 |

FOREIGN PATENT DOCUMENTS

| | | |
|---|---|---|
| DE | 202 14 904 U1 | 2/2003 |
| EP | 427468 A1 * | 5/1991 |
| JP | 53-0000478 | 1/1978 |
| JP | H08-105482 A | 4/1996 |
| JP | 2008-045716 | 2/2008 |

* cited by examiner

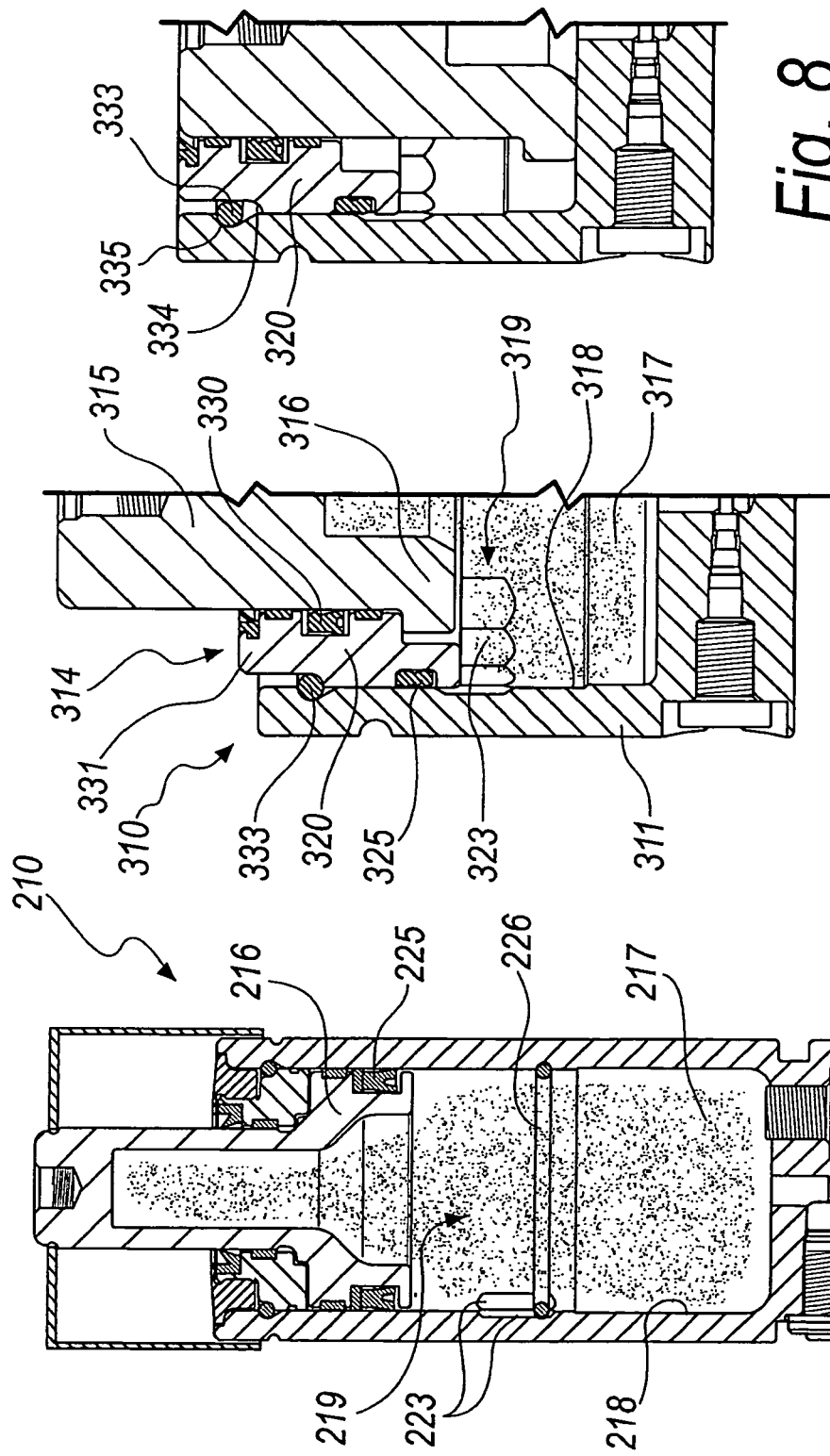

GAS CYLINDER ACTUATOR WITH OVERTRAVEL SAFETY DEVICE

BACKGROUND OF THE INVENTION

Gas cylinder actuators are generally formed by a tubular gas containment jacket, which is closed hermetically at one end by a bottom provided with a gas filling valve, and at the opposite end by a head portion, which is provided with a hole for the passage of a stem with a piston, which performs a translational motion inside the jacket; the jacket, the bottom and the head portion form the travel compartment for the piston, while the piston itself, with the jacket and the bottom, forms the gas compression and expansion chamber.

Such gas cylinder actuators are used typically but not exclusively also in situations, such as molds, die-forming presses and the like, in which they can be subjected to situations of high internal pressure or of impact with the associated parts of a press or a mold, such that they can be damaged; such damages can make the gas cylinder actuator itself unusable, requiring replacement and interruption of the machine or plant in which it is placed for working, but they can even be such as to harm an operator who is nearby, such as in the case of an explosion caused by an uncontrolled rise in pressure, or in the case of an explosion caused by damage to the piston-stem or to the parts that retain it inside the jacket, or in the case of rupture with uncontrolled loss of pressurized gas.

One of the reasons that mainly lead to such damage is the "overtravel" of the piston, i.e., a retracting travel of the stem with the piston that is longer than allowed from a construction point of view for that particular gas cylinder actuator.

This "overtravel" can be caused, for example, by an unexpected increase in the load on the stem of the actuator, which forces the stem to retract into the body of the actuator for an unexpected length, generating a pressure overload inside the actuator that the actuator structure as a whole may be unable to bear.

The actuator can thus splay or rupture in the connecting points between the parts that form it, or its sealing elements can fail, and in all the cited cases an unexpected, unwanted and dangerous rapid loss of gas can occur.

In order to prevent the occurrence of such dangerous situations of overtravel, gas cylinder actuators have been developed which comprise safety devices designed for the controlled and safe escape of the pressurized gas in the event of overtravel.

For example, EP0959263B1 in the name of Orflam Industries claiming priority of 22 May 1998, discloses and claims a device with a compressible fluid which comprises a compression chamber that contains compressible fluid, and a piston that can be moved in such compression chamber in a first direction for compressing such compressible fluid and in a second direction, which is opposed to the first one, in response to a force of the compressed fluid, the device comprising a safety element arranged so as to be struck by the piston if it performs an accidental travel that is longer than a preset nominal travel, such safety element being designed to discharge the compression chamber when it is struck by the piston.

A safety device for gas cylinder actuators is disclosed and claimed in WO2009/063003, in the name of this same Applicant.

Such safety device is characterized in that it comprises, associated with the bottom or with the jacket of a gas cylinder actuator, a breakable partition that is subjected to the pressure produced by the compressed gas inside a compression and expansion chamber of a gas cylinder actuator, such breakable partition being associated with a longitudinally elongated element that extends within such compression and expansion chamber over such a length as to intercept a part of the piston during its descent, before the piston performs a travel that is longer than the preset one (i.e., an overtravel); the longitudinally elongated element is supported by flexible supporting means adapted to allow, in the presence of a preset thrust of the piston on such longitudinally elongated element, the movement of such element so as to break the breakable partition, opening an outward outflow path for the gas.

Both cited safety systems for gas cylinder actuators, despite their effectiveness, have drawbacks.

A first drawback is linked to the fact that both technical solutions provide for the breakage of a part that is designed to allow the controlled escape of pressurized gas.

In order to restore the full functionality of the gas cylinder actuator, therefore, the part must be replaced, with a consequent use of labor and spare parts.

Another drawback is that the provision of such parts designed to break must be very precise, because it is crucial that such parts break exactly at the preset stress.

Otherwise, if the parts designed to break do not break at the designed loads, or break with at lower loads, the gas cylinder actuator would not be safe.

SUMMARY OF THE INVENTION

The aim of the present invention is to provide a gas cylinder actuator with a safety device in case of increasing pressure caused by overtravel that is capable of obviating the drawbacks of gas cylinder actuators and the safety devices of the known type.

Within this aim, an object of the invention is to provide a gas cylinder actuator with overtravel safety device that is very simple to reset if overtravel occurs.

Another object of the invention is to provide a gas cylinder actuator with a safety device that is at least as efficient and safe as known gas cylinder actuators.

Another object of the invention is to propose a gas cylinder actuator with overtravel safety device that is simple in structure and easy to use, can be manufactured with known systems and technologies, and at low cost.

This aim and these and other objects that will become better apparent hereinafter are achieved by a gas cylinder actuator with overtravel safety device, which comprises a tubular gas containment jacket which is closed hermetically at one end by a bottom provided with a gas filling valve and at the opposite end by a head portion, which is provided with a hole for the passage of a stem with a piston, said jacket, bottom and piston forming the gas compression and expansion chamber, said gas cylinder actuator being characterized in that it has, on the inner face of said jacket in said compression chamber, at least one region in low relief designed to interrupt the seal provided by the gasket means that are associated with said piston or with said head portion and operate against said inner face of the jacket, said at least one region in low relief being provided in such a position as to define the limit of the return stroke of said piston or of said head portion.

BRIEF DESCRIPTION OF THE DRAWINGS

Further characteristics and advantages of the invention will become better apparent from the following detailed description of five preferred but not exclusive embodiments of the gas cylinder actuator with overtravel safety device according to the invention, illustrated by way of non-limiting example in the accompanying drawings, wherein:

FIG. 6 is a sectional side view of a gas cylinder actuator according to the invention in a third embodiment thereof;

FIG. 7 is a sectional side view of a gas cylinder actuator according to the invention in a fourth embodiment thereof;

FIG. 8 is the same view of FIG. 7 with the gas cylinder actuator in an overtravel configuration;

DESCRIPTION OF THE PREFERRED EMBODIMENTS

Figure 1:
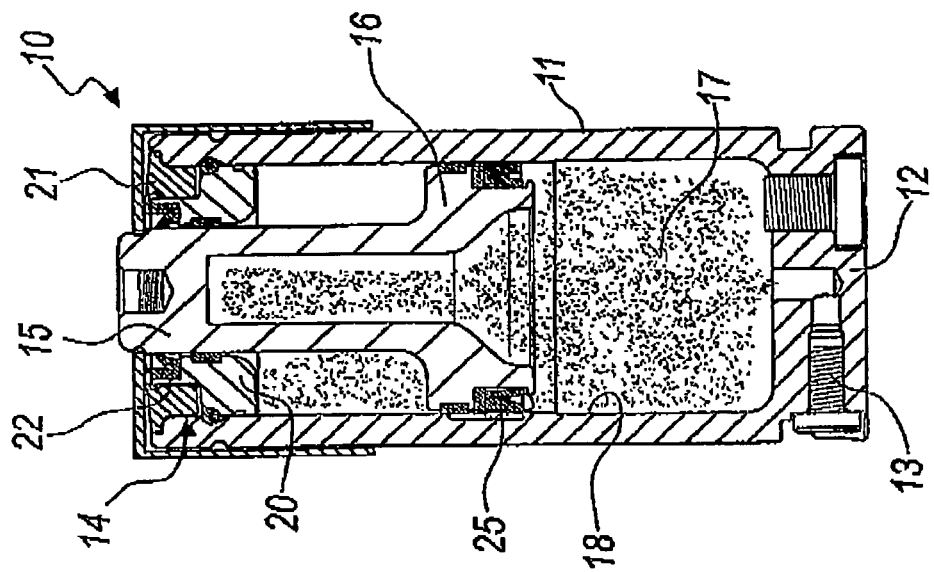
FIG. 1 is a sectional side view of a gas cylinder actuator according to the invention in a first embodiment.
Figure 2:
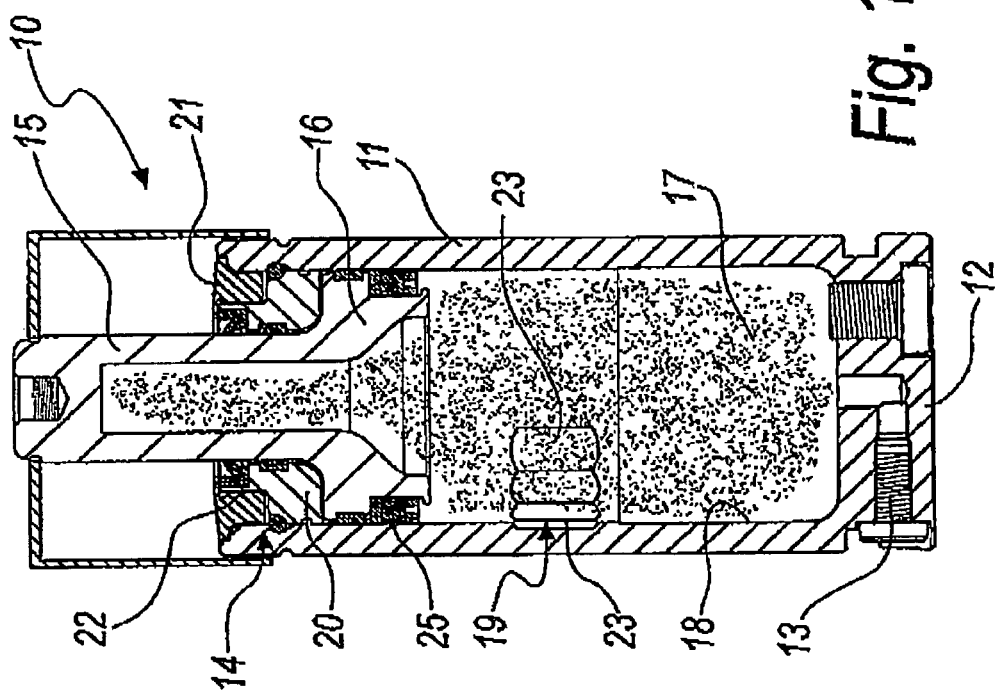
FIG. 2 is a view of the same gas cylinder actuator of FIG. 1 in an overtravel configuration.
Figure 3:
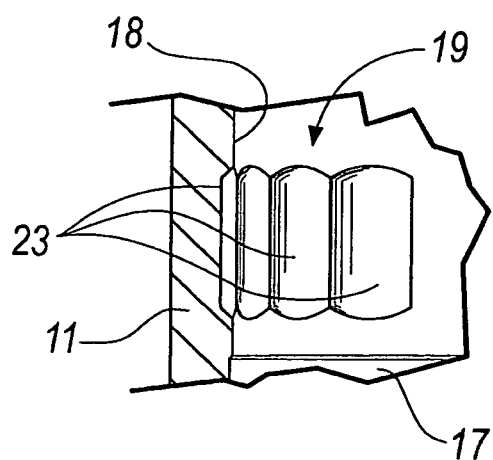
FIG. 3 is a view of a detail of FIG. 1.

With reference to the figures, a gas cylinder actuator with overtravel safety device according to the invention is generally designated, in its first embodiment, shown in FIGS. 1 and 2, by the reference numeral 10.

The gas cylinder actuator 10 comprises a tubular gas containment jacket 11, which is sealed hermetically at one end by a bottom 12 provided with a gas filling valve 13, and at the opposite end by a head portion 14, which is provided with a hole for the passage of a stem 15 with a piston 16.

The jacket 11, the bottom 12 and the piston 16 form the gas compression and expansion chamber 17.

The gas cylinder actuator 10 has, on the inner face 18 of the jacket 11, inside the compression chamber 17, a region 19 in low relief designed to interrupt the seal provided by the gasket means associated with the piston 16 or with the head portion 14.

In the first embodiment of the gas cylinder actuator 10 according to the invention, the head portion 14 is formed by an annular gasket supporting body 20 and by a closure ring 21, to be screwed onto a corresponding threaded neck 22 of the annular body 20 in order to lock it.

In the first embodiment of the invention, the region 19 in low relief is formed by a plurality of recesses 23.

The recesses 23 are provided side-by-side at the same height on an arc of the same perimetric band of the inner face 18 of the jacket 11.

In this first embodiment of the invention, the recesses 23 of the region in low relief 19 are designed to interrupt the seal provided by the gasket means associated with the piston 16.

The gasket means are provided, in the example described and shown, by a lip-shaped sealing ring 25.

The sealing ring 25, during the normal operation of the gas cylinder actuator 10, acts against the inner face 18 of the jacket 11.

The recesses 23 of the region in low relief 19 are provided in such a position as to form the limit of the return stroke of the piston 16. Therefore, if the piston 16 is pushed into the compression chamber 17 for a depth longer than the predefined travel, i.e., in the event of overtravel, as shown in FIG. 2, the sealing ring 25 encounters the recesses 23, losing its functionality.

Figure 4:
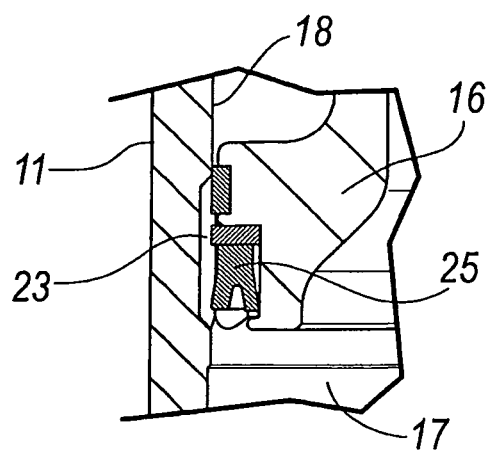
FIG. 4 is a view of a detail of FIG. 2.

Thus, in the event of an overtravel, as clearly shown in FIG. 4, the pressurized gas inside the chamber 17 finds an escape path in the gaps that form between the recesses 23 and the sealing ring 25.

Therefore, any risk of uncontrolled ejection of the stem 15 is avoided, because its upward movement will be determined by a relatively low internal pressure that is produced by the residue of the gas that has not escaped via the recesses 23 from inside the compression and expansion chamber 17, and thus the integrity of the gas cylinder actuator 10 and consequently the safety of nearby personnel are safeguarded.

The region in low relief 19, which is arranged so as to encounter the sealing ring 25 at the beginning of the overtravel for the piston 16, thus forms the safety device of the gas cylinder actuator according to the invention.

Figure 5:
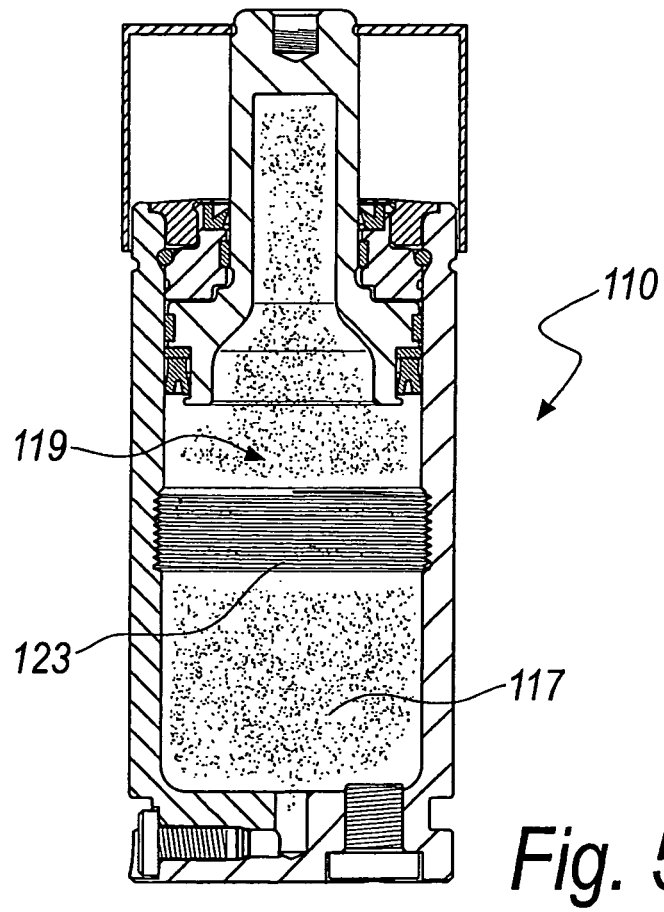
FIG. 5 is a sectional side view of a gas cylinder actuator according to the invention in a second embodiment thereof.
Figure 9:
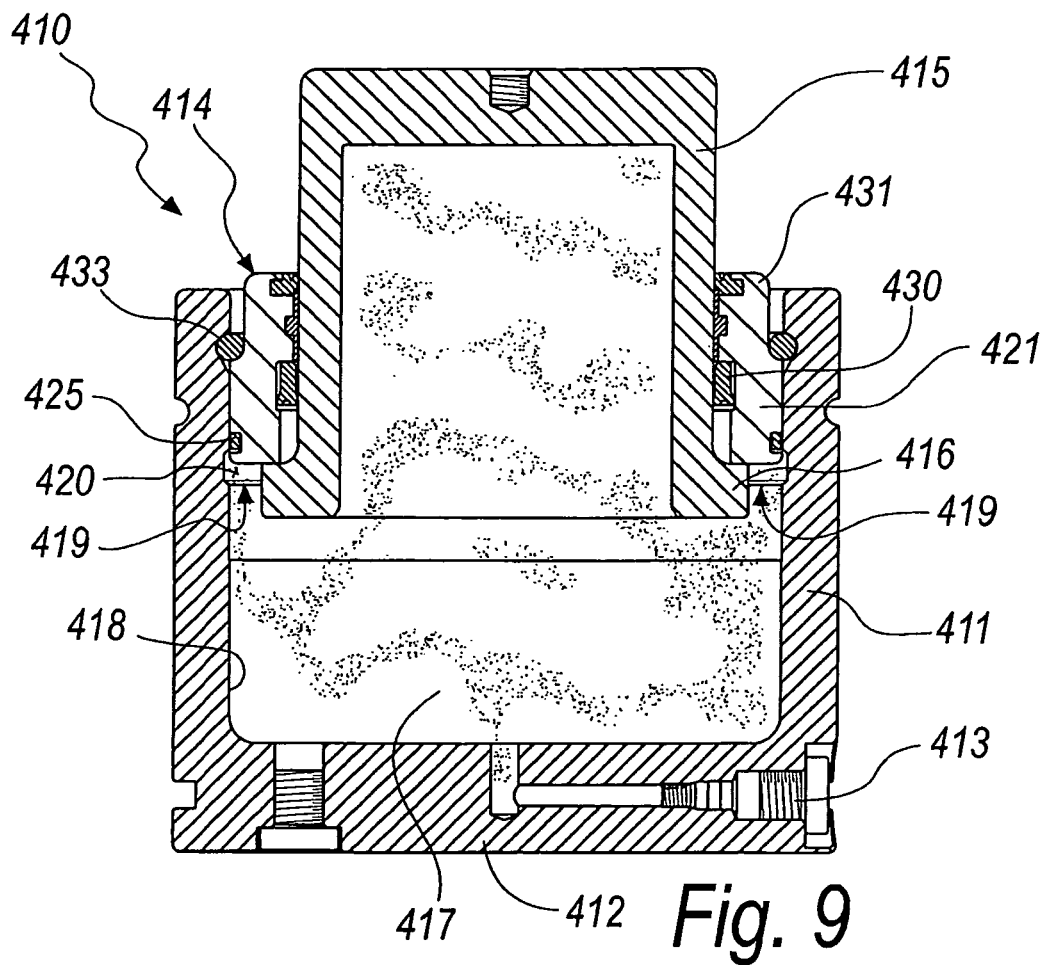
FIG. 9 is a sectional side view of a gas cylinder actuator according to the invention in a fifth embodiment thereof.
Figure 10:
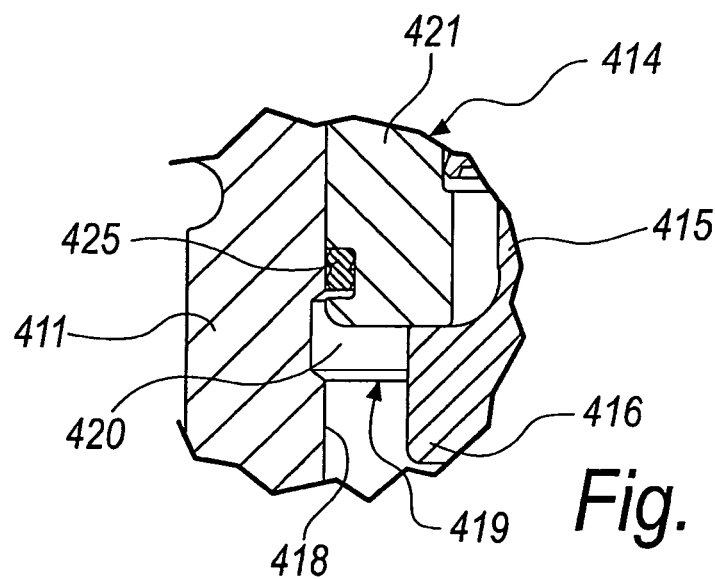
FIG. 10 is a view of a detail of FIG. 9.

In a second embodiment of the gas cylinder actuator according to the invention, which is shown in FIG. 5 and designated therein by the reference numeral 110, the region 119 in low relief is provided by a threaded portion 123, whose grooves between the threads form possible escape paths for the pressurized gas in the chamber 117.

In a third embodiment of the gas cylinder actuator according to the invention, shown in FIG. 6 and designated therein by the reference numeral 210, the region in low relief 219 is formed by recesses 223, in the same manner as described above for the first embodiment, at which a ring 226 is inserted which is preferably made of metal and is designed to facilitate the malfunction of the sealing ring 225, which strikes it by descending with the piston 216.

The ring 226, by intercepting the sealing ring 225 that is descending rapidly, facilitates its tearing or damage or separation from the inner face 218 of the chamber 217, enlarging in both cases the escape paths for the pressurized gas.

In a fourth embodiment of the gas cylinder actuator according to the invention, shown in FIG. 7 and therein designated by the numeral 310, the recesses 323 of the region in low relief 319 are designed to interrupt the seal provided by the gasket means associated with the head portion 314.

In this particular embodiment of the gas cylinder actuator 310 according to the invention, the head portion 314 is formed by a sleeve 320, which is provided axially with a hole for the passage of the stem 315 with the piston 316.

The sleeve 320 bears inner sealing rings 330 for the dynamic sealing with respect to the stem 315, and an outer sealing ring 325 that is pressed against the inner face 318 of the jacket 311.

The sleeve 320 is contoured so as to protrude from the jacket 311 by a distance 331 and is coupled to the inside of the jacket 311 so that it cannot move outward but can move toward the inside of the jacket 311, for example by means of an extraction-preventing ring 333 that is interposed between two opposite shoulders, a first shoulder 334 formed on the outside of the sleeve 320 and a second shoulder 335 provided on the inner face 318 of the jacket.

The pressure inside the compression chamber 317 keeps the sleeve 320 in the normal operating configuration.

The distance 331 of the sleeve 320 that protrudes from the jacket 311 extends axially over such a length as to intercept the body with which the stem 315 interacts before the stem 315, and thus the piston 316, begin to retract in overtravel.

In case of overtravel, therefore, which can occur until it determines a situation of mechanical compression of the free end of the jacket 311 by the associated press or half-mold, the sleeve 320, too, is pushed toward the inside of the jacket 311, together with the stem 315 and, by descending, makes the outer sealing ring 325 affect the recesses 323, as can be seen in FIG. 8.

The sealing ring 325 loses contact in the region in low relief 319 and the pressurized gas escapes through the gaps that form between the recesses 323 and the sealing ring 325.

In FIGS. 7 and 8, the region in low relief 319 is formed by recesses 323, in the same manner as described above for the first embodiment, but it must be understood that it can also be provided in other similar and equivalent manners, all of which are within the scope of the appended claims.

FIGS. 9 to 12 illustrate a gas cylinder actuator according to the invention in a fifth embodiment, which is generally designated by the reference numeral 410.

The gas cylinder actuator 410 comprises a tubular gas containment jacket 411, which is closed hermetically at one end by a bottom 412 provided with a gas filling valve 413 and at the opposite end by a head portion 414, which is provided with a hole for the passage of a stem 415 with a piston 416.

The jacket 411, the bottom 412 and the piston 416 form the gas compression and expansion chamber 417.

The gas cylinder actuator 410 has, on the inner face 418 of the jacket 411, inside the compression chamber 417, a region in low relief 419 that is designed to interrupt the seal provided by the gasket means associated with the head portion 414.

The region in low relief 419 is provided, in the fifth embodiment of the invention, by an annular slot 420.

The gasket means consist of a sealing ring 425, which provides a static seal and acts against the inner face 418 of the jacket 411.

The head portion 414 is formed by a sleeve 421, which is provided axially with a hole for the passage of the stem 415 with the piston 416.

The sleeve 421 supports an inner sealing ring 430 for the dynamic seal with the stem 415, in addition to the outer sealing ring 425, for providing a static seal, which is pressed against the inner face 418 of the jacket 411.

The sleeve 421 is shaped so as to protrude from the jacket 411 by a distance 431 and is coupled to the inside of the jacket 411 so as to be unable to move outward, but able to move toward the inside of the jacket 411, for example by means of an extraction-preventing ring 433 that is interposed between two opposite shoulders, a first shoulder 434 formed on the outside of the sleeve 421 and a second shoulder 435 on the inner face 418 of the jacket.

The pressure inside the compression chamber 417 keeps the sleeve 421 in the normal operating configuration.

The distance 431 of the sleeve 421 that protrudes form the jacket 411 extends axially over such a length as to intercept the body with which the stem 415 interacts before the stem 415 itself, and therefore the piston 416, begin to retract in overtravel.

Figure 11:
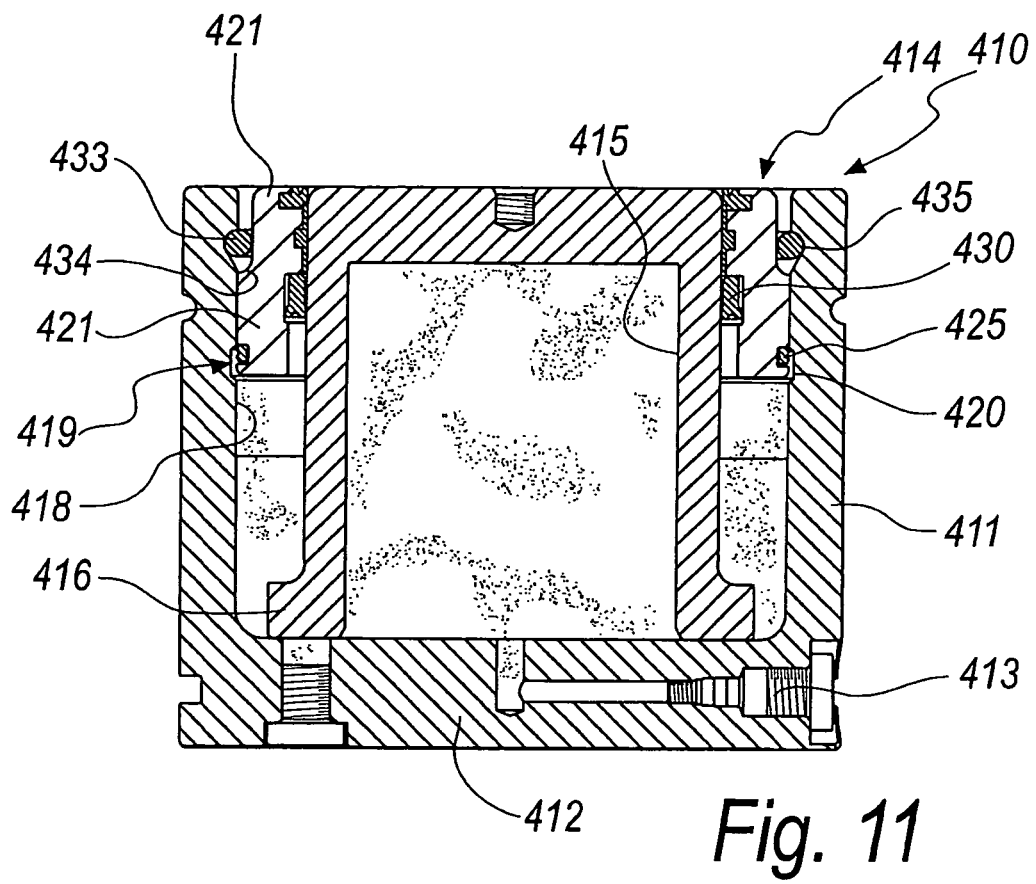
FIG. 11 is the same sectional side view of FIG. 9, in a second operating configuration.
Figure 12:
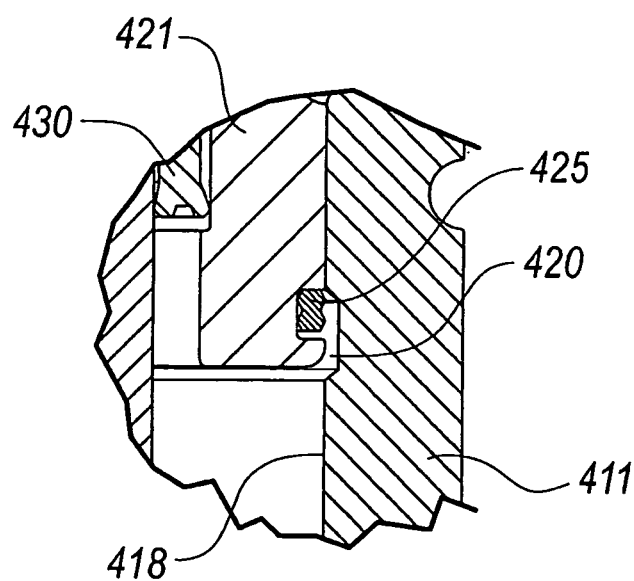
FIG. 12 is a view of a detail of FIG. 11.

In case of overtravel, therefore, which can reach a situation of mechanical compression of the free end of the jacket 411 by the associated press or half-mold, the sleeve 421, too, together with the stem 415, is pushed toward the inside of the jacket 411 and, by moving downward as in FIG. 11 causes the outer sealing ring 425 to affect the annular slot 420.

The sealing ring 425 loses contact in the region 419 in low relief and the pressurized gas escapes through the gaps that form between the annular slot 420 and the sealing ring 425.

The region in low relief 419 is thus arranged so as to encounter the sealing ring 425 at the beginning of the overtravel for the sleeve 421, and thus forms the safety device of the gas cylinder actuator 410 according to the invention.

When the sealing ring 425 is passed, the gas leaks out of the jacket of the gas cylinder actuator because the head portion 414 is not coupled hermetically, and the gaskets shown in the drawings and not designated by reference numerals are to be understood as oil seals, i.e., seals designed to prevent the entry of oil within the cylinder actuator but not to prevent the leakage of gas.

In the first four embodiments also, described by way of non-limiting example of the invention, when the sealing ring 25, 225 and 325 is passed, the gas seeps out of the jacket of the gas cylinder actuator because the head portion 14 and 314 is not coupled hermetically and the gaskets shown in the drawings and not designated by reference numerals are to be understood as oil seals, i.e., designed to prevent the entry of oil in the cylinder actuator but not to prevent the escape of gas.

In practice it has been found that the invention achieves the intended aim and objects.

In particular, the invention has devised a gas cylinder actuator with overtravel safety device that is extremely simple to restore if overtravel occurs; in fact, if the sealing ring 25 has encountered the region of low relief 19 without any damage, it is sufficient to restore the right pressure inside the compression chamber 17; if instead the sealing ring 225 is damaged, it is sufficient to replace it, which is a quick and low-cost operation.

If the associated press or the associated mould or other machine to which the gas cylinder actuator 10 is applied hits such cylinder actuator, causing in it such ruptures as to allow the ejection of the piston stem, the piston stem would be, when such ruptures took place, already subjected to a relatively weak thrust of the gas, thanks to the fact that the pressurized gas is in the meantime seeped through the regions of low relief.

Moreover, the present invention provides a gas cylinder actuator with safety device that is not less efficient and safe than known gas cylinder actuators and is much easier to provide, since it is sufficient to provide the regions of low relief on the inner face 18 of the jacket 11, without the need to separately provide complex devices that can be broken, as known in background art, and further must be arranged on the bottom or on the jacket of the cylinder actuator.

Moreover, the invention provides a gas cylinder actuator with overtravel safety device that is structurally simple and easy to use, can be produced with known plants and technologies and at low cost.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Applications No. PD2009A000043 and No. PD2009A000096 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A gas cylinder actuator with overtravel safety device, comprising a tubular gas containment jacket which is closed hermetically at one end by a bottom provided with a gas filling valve and at an opposite end by a head portion, said head portion being provided with a hole for a passage of a stem with a piston, said jacket, said bottom and said piston forming a gas compression and expansion chamber, said gas cylinder actuator having, on an inner face of said jacket in said gas compression and expansion chamber, at least one region in low relief adapted to interrupt a seal provided by a gasket associated with said piston or with said head portion and acting against said inner face of the jacket, said at least one region in low relief being provided in such a position as to define a limit of a return stroke of said piston or of said head portion, said region in low relief being formed by a plurality of recesses that extend in a direction of movement of said piston and that are arranged mutually side-by-side at a same height on an arc of a same perimetric band of the inner face of the jacket, said plurality of recesses being adapted to interrupt the seal provided by the gasket associated with the head portion.

2. The gas cylinder actuator according to claim 1, wherein said gasket comprises a sealing ring, and said region in low relief, which is arranged so as to encounter said sealing ring at a beginning of an overtravel for the piston or the beginning of travel for the head portion, forms a safety device of the gas cylinder actuator.

3. The gas cylinder actuator according to claim 1, wherein said head portion is formed by a sleeve, which is provided axially with said hole for the passage of the stem with the piston, said sleeve supporting inner sealing rings for a dynamic seal with the stem, and said sleeve supporting said gasket that comprises an outer sealing ring that is pressed against the inner face of the jacket, said sleeve being shaped so as to protrude from the jacket by a distance and being coupled to the inside of said jacket so as to be unable to move outward but able to move toward the inside of the jacket.

* * * * *